United States Patent [19]
Uehara

[11] Patent Number: 5,267,250
[45] Date of Patent: Nov. 30, 1993

[54] CIRCUIT ARRANGEMENT FOR DETECTION OF AN ERRONEOUS SELECTION SIGNAL SUPPLIED TO SELECTION MEANS

[75] Inventor: Izushi Uehara, Tokyo, Japan

[73] Assignee: NEC Corporation, Tokyo, Japan

[21] Appl. No.: 627,835

[22] Filed: Dec. 17, 1990

[30] Foreign Application Priority Data

Dec. 19, 1989 [JP] Japan .................................. 1-330827

[51] Int. Cl.$^5$ .............................................. G06F 11/00
[52] U.S. Cl. .................................. 371/57.1; 371/57.2; 371/52
[58] Field of Search ................... 371/57.1, 24, 67.1, 371/52, 71, 57.2, 48

[56] References Cited

U.S. PATENT DOCUMENTS

| | | | |
|---|---|---|---|
| 3,610,842 | 10/1971 | Formenti et al. | 371/57.1 |
| 4,020,460 | 4/1977 | Jones et al. | 340/146.1 AB |
| 4,380,813 | 4/1983 | Fogell et al. | 371/52 |
| 4,945,540 | 7/1990 | Kaneko | 371/57.1 |
| 4,949,343 | 8/1990 | Kaneko | 371/57.1 |

Primary Examiner—Robert W. Beausoliel, Jr.
Assistant Examiner—Ly V. Hua
Attorney, Agent, or Firm—Foley & Lardner

[57] ABSTRACT

An erroneous selection signal detecting circuit in a data transfer system. Conventional error detecting systems may not be capable of detecting errors in the selection signal generating circuit using available parity of checksum procedures. The selector means in the present invention selects one of a plurality of input signals on the basis of selection information. This information is applied both to appropriate selection circuits and to two additional selecting circuits also continually receiving fixed data input values. The outputs from these additional circuits are compared to the selection signals through EXCLUSIVE-OR gates, a particular logical indication from the EXCLUSIVE-OR gates indicating a malfunction.

8 Claims, 2 Drawing Sheets

CIRCUIT ARRANGEMENT FOR DETECTION OF AN ERRONEOUS SELECTION SIGNAL SUPPLIED TO SELECTION MEANS

BACKGROUND OF THE INVENTION

The invention relates to a circuit arrangement for detection of an erroneous selection signal supplied to a selection means.

In a conventional circuit arrangement of this type, an erroneous selection signal supplied to a selection circuit can be detected by adding a parity bit to a selection signal at a selection signal generating circuit and conducting a parity check for the selection signal by a parity check circuit provided on the input side of the selection circuit.

However, such a conventional circuit arrangement has a disadvantage that when a fault occurs at any of the selection signal generating circuit and the parity check circuit, error detection of selection signals is not properly performed.

SUMMARY OF THE INVENTION

According to an aspect of the invention, there is provided a circuit arrangement which comprises: selection means for selecting one of a plurality of input signals on the basis of selection information; transfer means for transferring said selection information to said selection means; fault detection information generating means which receives said selection information via said transfer means to produce fault detection information having a predetermined relationship with said selection information; and fault detection means which receives said selection information directly without passing through said transfer means and examines whether or not the received selection information has a predetermined relation with the fault detection information from said generating means.

BRIEF DESCRIPTION OF THE DRAWINGS

Other features and advantages will become apparent from the following description when taken in conjunction with the accompanying drawings in which.

DETAILED DESCRIPTION OF THE PREFERRED EMBODIMENT OF THE INVENTION

Figure 1:
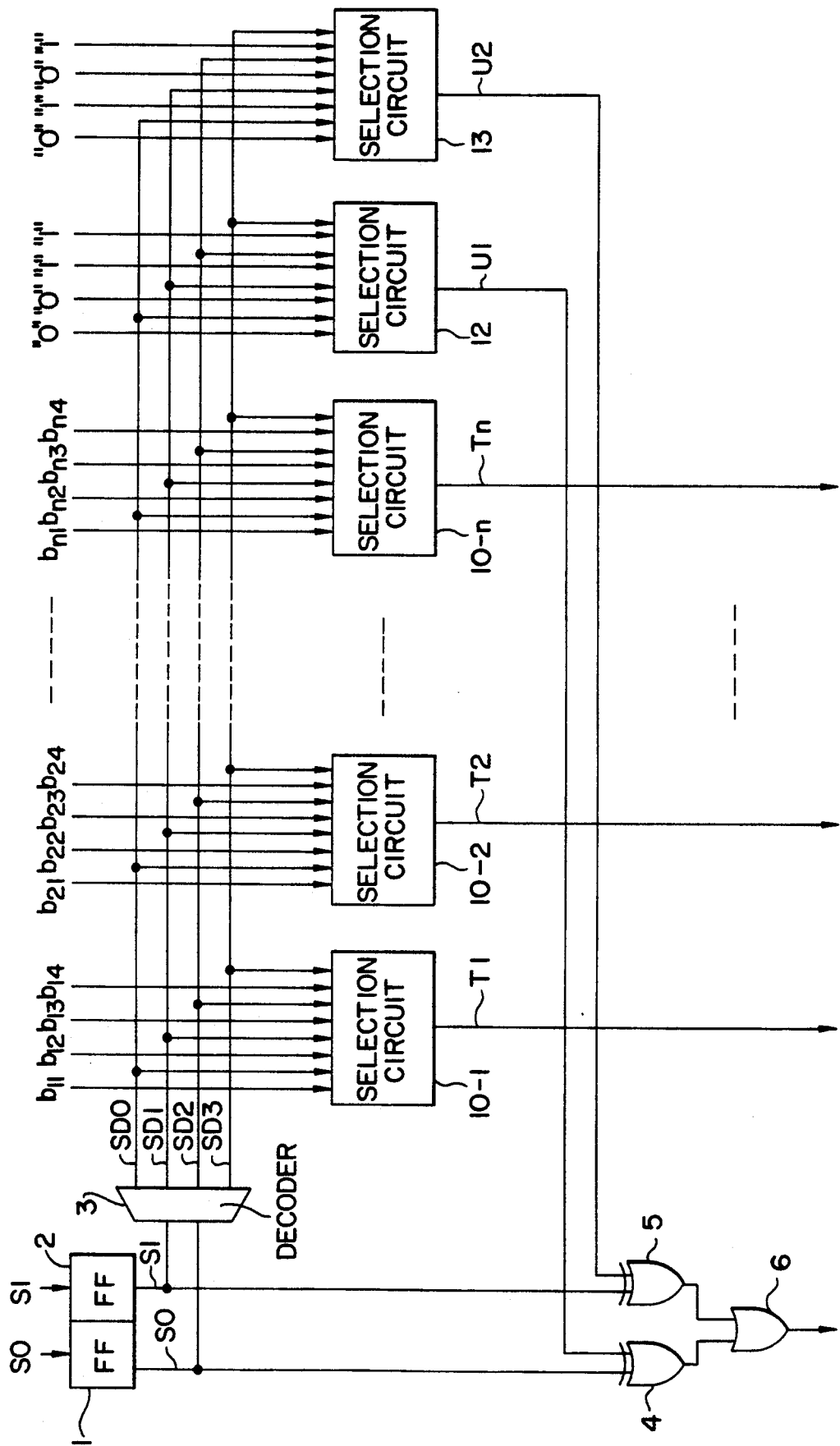
FIG. 1 is a circuit diagram of an embodiment of the invention.

Referring now to FIG. 1, an embodiment of the invention comprises: flip-flops 1 and 2; a decoder 3 connected to the output terminals of the flip-flops 1 and 2; an exclusive OR gate 4 having a first input terminal connected to the output terminal of the flip-flop 1 and a second input terminal; an exclusive OR gate 5 having a first input terminal connected to the output terminal of the flip-flop 2 and a second input terminal; an OR gate 6 having a first input terminal and a second input terminal connected to the output terminals of the gates 4 and 5, respectively; n selection circuits 10-1 to 10-n (n is a positive integer) each of which is supplied with corresponding four bits out of four data of n bits each, $D_1(b_{11}$ to $b_{n1})$, $D_2(b_{12}$ to $b_{n2})$, $D_3(b_{13}$ to $b_{n3})$ and $D_4(b_{14}$ selection circuit 12 having an output terminal connected to the second input terminal of the gate 4; and a selection circuit 13 having an output terminal connected to the second input terminal of the gate 5.

Figures 2, 3, 4:
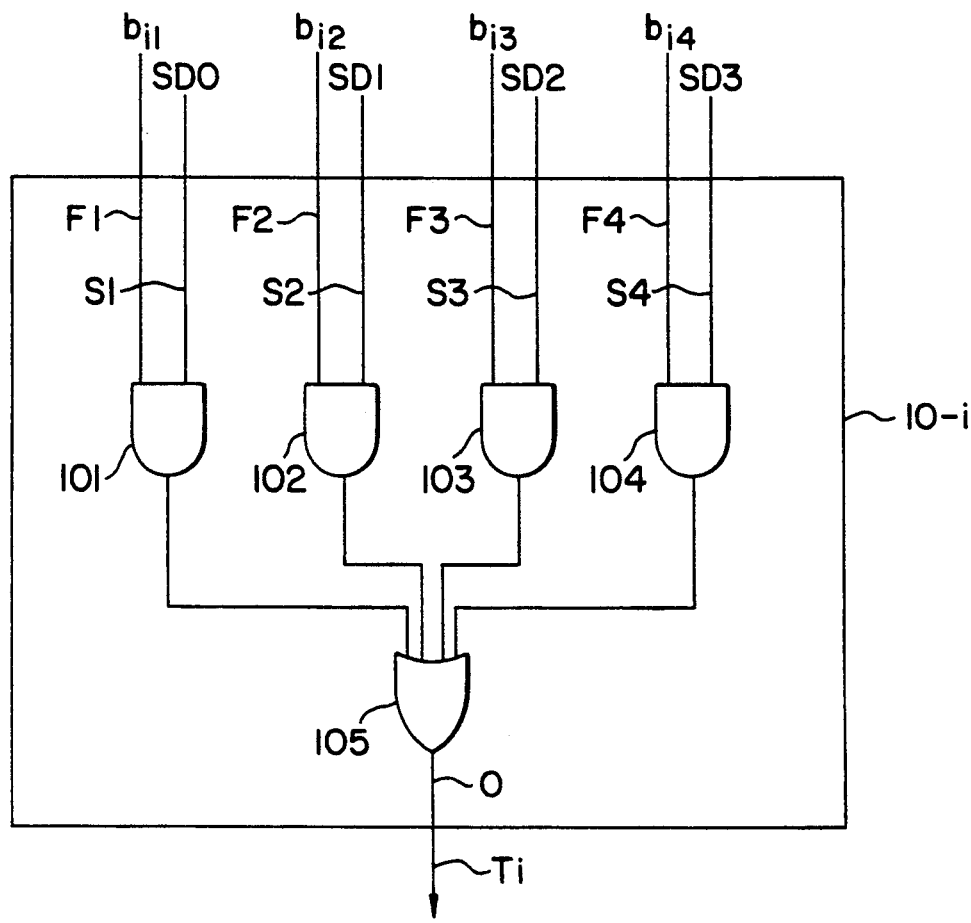
FIG. 2 is a block diagram of one of circuits 10-1–10-n, 12 and 13 shown in FIG. 1.
FIG. 3 shows a truth table of a decoder 3 shown in FIG. 1.
FIG. 4 shows a truth table of the circuits 12 and 13.

Referring to FIG. 2, one $10-i (1 \leq i \leq n)$ of the selection circuits 10-1 to 10-n comprises an AND gate 101 having a first input terminal F1 given the i-th bit $b_{i1}$ of the data $D_1$ and a second input terminal S1 connected to an output terminal $SD_0$ of the decoder 3, an AND gate 102 having a first input terminal F2 given the i-th bit $b_{i2}$ of the data $D_2$ and a second input terminal S2 connected to an output terminal $SD_1$ of the decoder 3, an AND gate 103 having a first input terminal F3 given the i-th bit $b_{i3}$ of the data $D_3$ and a second input terminal S3 connected to an output terminal $SD_2$ of the decoder 3, an AND gate 104 having a first input terminal F4 given the i-th bit $b_{i4}$ of the data $D_4$ and a second input terminal S4 connected to an output terminal $SD_3$ of the decoder 3, and an OR gate 105 which performs the logical add operation of the outputs of the gates 101 through 104.

The flip-flops 1 and 2 hold a pair of selection indication signals S0 and S1. The signals S0 and S1 are given to the decoder 3, which in turn produces a logical "1" signal from one of the output terminals $SD_0$ through $SD_3$ in accordance with a truth table shown in FIG. 3.

The circuits 12 and 13 have the structure identical to that of the selection circuit 10-i shown in FIG. 2. In the circuit 12, however, the first input terminals F1 through F4 of the gates 101 through 104 are constantly applied with signals of logical levels "0", "0", "1" and "1", respectively. In the circuit 13, on the other hand, they are constantly applied with signals of logical levels "0", "1", "0" and "1", respectively. As a result, if no fault occurs in any portions of the circuitry shown in FIG. 1, the relationship among the signals S0 and S1 and output signals U1 and U2 produced from the circuits 12 and 13 becomes the one shown in the truth table in FIG. 4. Under such a relationship, if all the portions are normal, the gate 6 always produces a logical "0" signal. On the other hand, if a fault occurs in the decoder 3, for example, and thus the logical "1" signal is not produced from the correct output terminal, the relationship shown in the table of FIG. 4 is not satisfied, and a logical "1" signal is produced from the gate 6, which means the occurrence of a fault. In this manner, malfunction relating to the selection signals S0 and S1 can be detected.

What is claimed is:

1. A circuit arrangement for detection of an erroneous selection signal comprising:
   selection information generating means for generating selection information;
   transfer means receiving said selection information transferred by said transfer means for selecting one of a plurality of input signals on a basis of said selection information;
   fault detection information generating means receiving said selection information through said transfer means for generating fault detection information having a predetermined relationship with said selection information; and
   fault detection means, receiving said selection information directly from said selection information generating means without passing though said transfer means and receiving said fault detection information from si fault detection generating means, for examining whether or not said selection information has said predetermined relationship with said fault detection information and for outputting an error signal when said selection information as directly received does not have said predetermined relationship with said fault detection information.

2. A circuit for detecting an erroneous selection signal in a data transfer system, comprising:

a plurality of data selection circuits, each receiving data to be transferred;

a decoder for selecting the data to be transferred from each selection circuit and accordingly providing selection signals to each of said data selection circuits;

a pair of error detecting circuits, each receiving the selection signals applied to the plurality of data selection circuits and also continually receiving fixed input signals;

means for comparing the outputs from the pair of error detecting circuits to input signals to the decoder, to detect from the output of the comparing means if the selection signal is correct or erroneous.

3. The circuit of claim 2, in which the input to the decoder is a flip-flop, the decoder providing data selection signals in response to the output signals from the flip-flop.

4. The circuit of claim 2, in which each of said plurality of selection circuits include a plurality of AND gates, each of said AND gates having one data input and one data selection input.

5. The circuit of claim 4, in which the output of each of said selection circuit AND gates provide an input to an OR gate.

6. The circuit of claim 2, wherein each of said error detecting circuits include a plurality of AND gates, each AND gate receiving at one input a data selection signal and at the other input a predetermined fixed signal.

7. The circuit of claim 6, in which the outputs of the plurality of AND gates form the inputs to an OR gate in each error detecting circuit.

8. The circuit of claim 7, in which the output signal of each OR gate forms the input to one of the other of a pair of EXCLUSIVE OR gates, the other input to each EXCLUSIVE OR gates being the data selection signal, the outputs of each EXCLUSIVE OR gate forming the inputs to an OR gate, whereby the output of the AND gate indicates if an erroneous selection signal has been generated.

* * * * *